United States Patent
Oltramari et al.

(10) Patent No.: US 11,092,450 B2
(45) Date of Patent: Aug. 17, 2021

(54) SYSTEM AND METHOD FOR CROWDSOURCED DECISION SUPPORT FOR IMPROVING PUBLIC TRANSIT RIDING EXPERIENCE

(71) Applicant: Robert Bosch GmbH, Stuttgart (DE)

(72) Inventors: Alessandro Oltramari, Pittsburgh, PA (US); Wan-Yi Lin, Pittsburgh, PA (US); Lixiu Yu, Pittsburgh, PA (US)

(73) Assignee: ROBERT BOSCH GMBH, Stuttgart (DE)

( * ) Notice: Subject to any disclaimer, the term of this patent is extended or adjusted under 35 U.S.C. 154(b) by 237 days.

(21) Appl. No.: 16/234,756

(22) Filed: Dec. 28, 2018

(65) Prior Publication Data
US 2020/0209000 A1    Jul. 2, 2020

(51) Int. Cl.
*G01C 21/34*    (2006.01)
*G01C 21/36*    (2006.01)

(52) U.S. Cl.
CPC ..... *G01C 21/3453* (2013.01); *G01C 21/3667* (2013.01); *G01C 21/3697* (2013.01)

(58) Field of Classification Search
CPC ............ G01C 21/3453; G01C 21/3697; G01C 21/3667; G01C 21/3423
See application file for complete search history.

(56) References Cited

U.S. PATENT DOCUMENTS

| | | | |
|---|---|---|---|
| 2008/0195428 A1* | 8/2008 | O'Sullivan | G08G 1/123 705/6 |
| 2013/0041941 A1 | 2/2013 | Tomasic et al. | |
| 2013/0046456 A1* | 2/2013 | Scofield | G01C 21/3453 701/117 |
| 2019/0251509 A1* | 8/2019 | Simpson | G06Q 30/08 |

OTHER PUBLICATIONS

Few, Stephen, Practical Rules for Using Colors in Charts, 2008, PerceptualEdge.com, pp. 3 and 4 (Year: 2008).*
DataVizCatalogue.com, Stacked Bar Graph, 2017, DataVizCatalogue.com (Year: 2017).*
DataVizCatalogue.com, BarChart, 2017, DataVizCatalogue.com (Year: 2017).*
Yu-Quin et al., "Route Choice Model Considering Generalized Travel Cost Based on Game Theory", Hindawi Publishing Corporation, Mathematical Problems in Engineering, vol. 2013, Article ID 464038, 5 pages.
Sun et al., "An equilibrium model for urban transit assignment based on game theory", Elsevier, ScienceDirect, www.sciencedirect.com, European Journal of Operational Research 181 2007) pp. 305-314.

(Continued)

*Primary Examiner* — Alan D Hutchinson
*Assistant Examiner* — Andy Schneider
(74) *Attorney, Agent, or Firm* — Brooks Kushman P.C.

(57) ABSTRACT

A decision-support system for a public transportation system includes a computing system programmed to generate public transit route options for the commuter based on at least one decision factor that estimates an expected impact on other commuters resulting from the commuter choosing each of the public transit route options, and output, for display, values associated with the at least one decision factor to influence the commuter in making a route selection.

17 Claims, 6 Drawing Sheets

(56) References Cited

OTHER PUBLICATIONS

Hollander et al., "The applicability of non-cooperative game theory in transport analysis", Transportation (2006) 33:481-496, Springer Science+Business Media B.V. 2006.

"Public Transport Crowdsourcing", crowdscorced-transport.com, Civic Technology for Sustainable Transport, 13 pages, Dated 2018 based on Copyright.

Gardiner et al., "Distributed Transit Rider Messaging", Final Project Report, Technologies for Safe and Efficient Transportation, a U.S. DOT University Transportation Center, Carnegie Mellon University, Pittsburgh, PA, Dec. 2013, 29 pages.

* cited by examiner

SYSTEM AND METHOD FOR CROWDSOURCED DECISION SUPPORT FOR IMPROVING PUBLIC TRANSIT RIDING EXPERIENCE

TECHNICAL FIELD

The present disclosure relates to a decision-support system for users of a public transportation system.

BACKGROUND

Mapping and routing applications are available for providing navigation instructions for personal trips. The focus of such applications has been on navigation for personal transportation vehicles. However, less work has been directed toward improving routing and guidance for public transportation. Further, any efforts in this area focus on optimizing routes for each individual. The public transportation system as a whole is not considered.

SUMMARY

A decision-support system for public transportation includes a computing system programmed to present, on a display, a plurality of public transit route options for a commuter and at least one display element that communicates relative values of a parameter corresponding to a decision factor that measures an expected impact on other commuters caused by the commuter selecting each of the public transit route options and further identifying one of the public transit route options as a recommended option for the decision factor.

The decision factor may be an urgency level of the other commuters expected to travel on each of the public transit route options and wherein the recommended option is the one of the public transit route options having a least urgency level. The decision factor may be a number of alternative transit choices available to the other commuters expected to travel on each of the public transit route options, and wherein the recommended option is the one of the public transit route options having a greatest number of alternative transit choices. The decision factor may be a measure of cooperativeness of the other commuters expected to travel on each of the public transit route options and the recommend option is the one of the public transit route options having a least measure of cooperativeness. The display element may be a bar of a predetermined length having colored segments representing each of the public transit route options, and wherein a length of each of the colored segments may be based on values associated with the decision factor for each of the public transit route options. The recommended option may be identified by the one of the public transit route options associated with a left-most colored segment. The recommended option may be identified by the one of the public transit route options associated with one of the colored segments being a predetermined color. The display element may be an axis that defines an origin and defines markers displaced from the origin that represent each of the public transit route options, wherein the markers are displaced from the origin based on values associated with the decision factor for each of the public transit route options.

A decision-support system for a commuter interacting with a public transportation system, the decision-support system includes a computing system programmed to generate public transit route options for the commuter based on at least one decision factor that estimates an expected impact on other commuters resulting from the commuter choosing each of the public transit route options, and output, for display, values associated with the at least one decision factor to influence the commuter in making a route selection.

The computing system may be further programmed to monitor choices of the public transit route options made by the commuter to update and maintain a commuter decision history for each commuter. The computing system may be further programmed to generate the public transit route options using a game theory algorithm that incorporates commuter decision histories and commuter behavior models to produce an equilibrium solution for all commuters. The computing system may be further programmed to monitor choices by the commuters over time to produce a commuter behavior model and use the commuter behavior model to predict commuter responses to public transit route options. The computing system may be further programmed to identify one of the public transit route options as being preferred for the at least one decision factor. The computing system may be further programmed to generate at least one public transit route option for the commuter based on at least one decision factor that is based on a commuter profile and a commuter intent for a proposed commute. The computing system may be further programmed to, for at least one of the decision factors, provide a public transit option that results in a preferred route for which other commuters have more alternatives than for the other public transit options.

A method includes generating public transit route options for a commuter based on at least one decision factor that estimates an expected impact on other commuters resulting from the commuter choosing each of the public transit route options. The method further includes outputting, for display, at least one display element that shows relative magnitudes of values associated with the at least one decision factor for each of the public transit route options to influence the commuter in making a route selection.

The may further include applying a game theory algorithm to generate the public transit route options for the commuter to find an equilibrium routing solution for all commuters. The method may further include receiving data from mobile devices of each of the commuters that includes commuter intent data and location data. The method may further include generating a value indicative of commuter cooperativeness for each of the commuters presented with the transit route options, wherein the value increases when the commuter chooses a routing option for which a corresponding trip time is greater than a trip time corresponding to another of transit route options. The method may further include monitoring choices made by the commuter over time to produce a commuter behavior model and using the commuter behavior model to predict commuter responses to public transit route options.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Many cities operate a public transportation system for transporting people from location to location. The cities may provide different modes of public transportation including trains, buses, trolleys, subways, and electric rail systems to name a few. As such, for any given trip, there may be more than one route and more than one mode or combination of modes of public transportation that can accommodate the traveler. The routes may be characterized by distance, number of modes of public transportation, time to complete, walking distance, and the number of transfers/connections.

Automated route guidance systems may assist a traveler in selecting a route. However, typical route guidance systems provide little more than route information. Typical route guidance systems focus on the goals and needs of each individual rider without considering wider goals of collaboration among public transit users. For example, typical route guidance systems generally produce a recommendation for a route that has the shortest trip time without considering other decision factors. Public transportation systems may benefit by decision-support systems that encourage travelers to consider factors other than just the shortest trip time when selecting a route.

Figure 1:
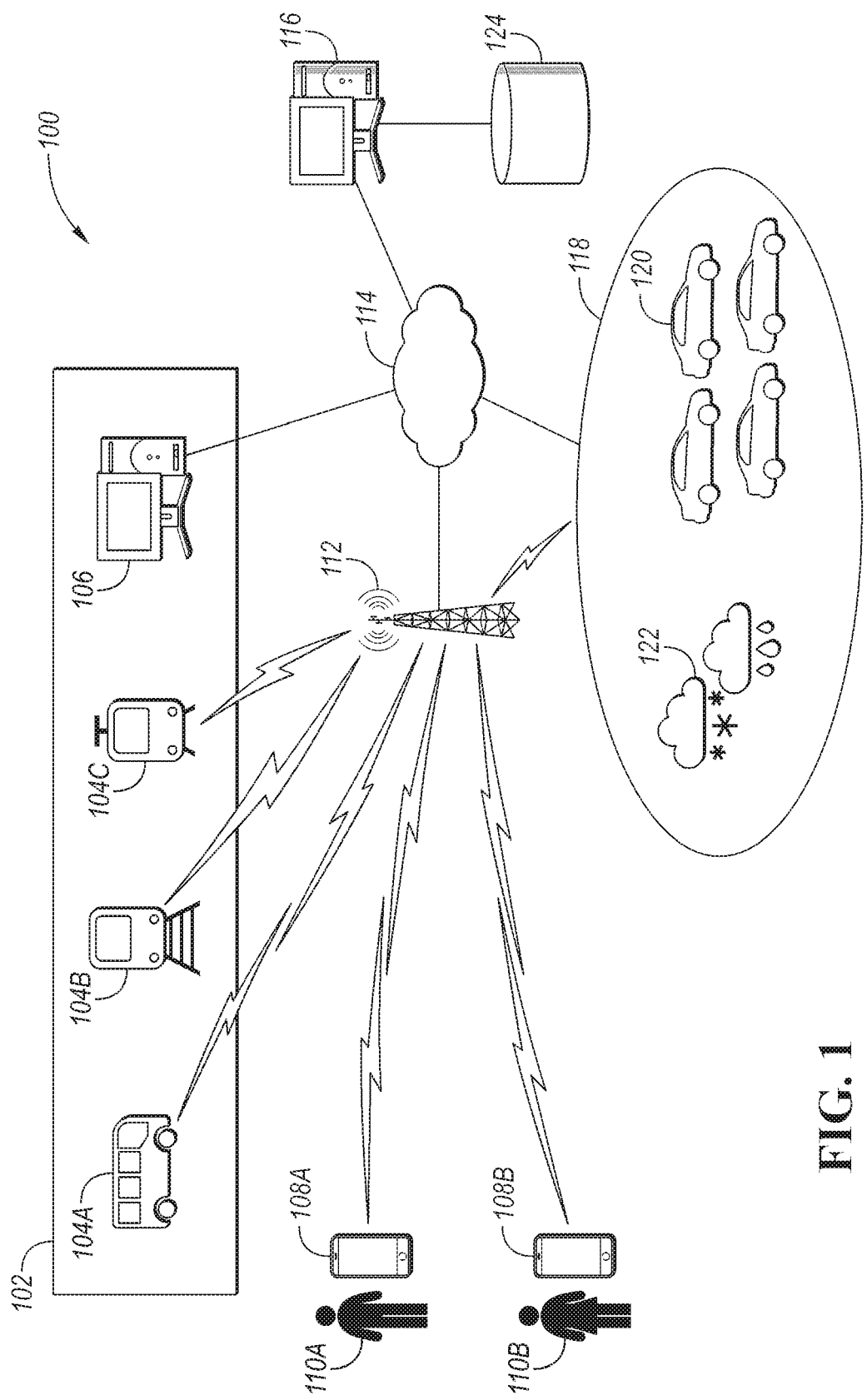
FIG. 1 is a possible configuration for decision-support system for users of a public transportation system.

FIG. 1 depicts a diagram of a decision-support system (DSS) 100 for a public transportation system. The DSS 100 may be described as a system that processes information from commuters and transit-related sources to provide transit and route options that may be ranked based on various decision factors. The information related to the transit and route options may be presented to commuters for consideration. The DSS 100 may provide information depicting the relative merits of selecting one transit route over other routes to aid the commuter in selecting a route.

The DSS 100 may process information from many sources. The DSS 100 may receive inputs from a public transportation system 102. The public transportation system 102 may be operated by a public transit authority with the goal of providing public transportation to the community or region. The public transportation system 102 may operate a plurality of public transit resources 104 (e.g., vehicles, stations). The public transit resources 104 may include various modes of transportation including but not limited to buses (e.g., 104A), rail vehicles (e.g., 104B), and streetcars (e.g., 104C). The public transportation system 102 may further include one or more public transit servers 106 for processing and storing data related to the public transportation system 102. The public transit servers 106 may host one or more websites accessible to the public. For example, the websites may provide an interface for viewing schedules, relaying information about the public transportation system 102, and purchasing fares. The public transit servers 106 may monitor and distribute information regarding crowding and usage levels of public transit resources 104.

The DSS 100 may interface with a cellular network 112. The cellular network 112 may include interfaces for enabling communication between devices that are part of and/or interact with the DSS 100. The cellular network 112 may interface with an external network 114. The external network 114 may be the Internet or world-wide web. The external network 114 may facilitate communication between and with additional devices and systems. The public transit resources 104 may include a cellular network communication interface for transferring information to the cellular network 112 and external network 114. The public transit servers 106 may include an interface to the external network 114. For example, the public transit servers 106 may interface with a local Ethernet router that is configured to access the external network 114. Communication with the external network 114 may be wired or wireless.

The DSS 100 may include an application server 116 that is in communication with the external network 114. The application server 116 may be a computing system including a processing unit for executing instructions and volatile and non-volatile memory for storing instructions and data. The application server 116 may include a terminal for interfacing with a system administrator. The application server 116 may be configured to generate and maintain a database 124. The database 124 may be configured to store and recall information related to the DSS 100. The database 124 may include non-transitory memory storage elements to store data.

The DSS 100 may receive data from external systems and sensors 118. The external system and sensors 118 may provide data on conditions that may affect the operation of the public transportation system 102. The external system and sensors 118 may be configured to communicate via the cellular network 112 and/or the external network 114. The external systems 118 may include external servers that provide construction and road closure/detour information (e.g., road authority website).

The external sensors 118 may include traffic sensors 120 that are configured to monitor and predict traffic at various locations. Traffic sensors 120 may include sensors installed at traffic signals, sensors installed on roadways, and/or cameras installed at various location. The traffic sensors 120 may include information from sensors installed in vehicles and/or carried by occupants of the vehicles. The traffic sensors 120 may include data that is aggregated from the vehicles and occupants (e.g., traffic information from a mapping/routing application). The traffic sensors 120 may be configured to provide an indication of traffic conditions that may affect the public transportation system 102.

The external systems and sensors 118 may include weather sensors 122 for monitoring and/or predicting past, present, and future weather conditions. The weather sensors 122 may include physical sensors as well as forecasts derived from physical sensors. The weather sensors 122 may include temperature sensors, pressure sensors, cameras, and radar systems. The weather sensors 122 may provide an indication of weather conditions that may affect the public transportation system 102. The weather sensors 122 may include sensors that detect actual road conditions. The weather sensors 122 may include weather reports retrieved from external servers or networks.

The DSS 100 may further receive data associated with commuters 110 (people, users, riders, travelers) that are interactive with the public transportation system 102. Commuters 110 may include persons that are using or may use the public transportation system 102. Each commuter 110 may carry a mobile device 108. For example, the mobile device 108 may be a cellular phone, a tablet and/or a smart watch. The mobile device 108 may be configured to communicate via the cellular network 112 and/or the external network 114. The mobile devices 108 may include a cellular communication interface and a wireless network interface for communication. The mobile devices 108 may further include a Global Positioning System (GPS) sensor and interface. The GPS sensor and interface may provide location information of the mobile devices 108. The mobile devices 108 may include a user interface such as a touchscreen for presenting information to the commuters 110 and receiving instructions from the commuters 110.

The mobile devices 108 may include a processing unit for executing instructions and volatile and non-volatile memory for storing programs and data. The mobile devices 108 may execute an operating system to manage program or application execution. The DSS 100 may be implemented as one or more applications executed on the application server 116. The DSS 100 may be implemented as a mobile application on the mobile devices 108. The primary interface for the commuters 110 to the DSS 100 may be the mobile devices 108. In some configurations, an interface may be provided to commuters 110 via a web interface that permits access by a device (e.g., personal computer) using a web browser application.

Each commuter 110 that is interacting with the public transportation system 102 may have different needs and requirements on different occasions. For example, each commuter 110 may have a different deadline for reaching a destination. A commuter 110 traveling to work may desire to arrive at a specific time without being late. A commuter 110 traveling for personal errands may desire to arrive at a specific location but without any strict time-frame. The DSS 100 may be configured to consider the requirements of each trip to maximize overall utility of the public transportation system 102. The DSS 100 may be configured to incorporate such information into the route suggestions to optimize the overall public transportation experience for all commuters.

The DSS 100 for public transportation commuters 110 can improve the customer experience by analyzing commuter competition for public transit resources 104 and encouraging collaboration among commuters 110. The DSS 100 enables commuters 110 to share information collaboratively to promote improved timing and routing for public transit resources 104 and considers both self-interest and public interest. The DSS 100 may be configured to mediate the competing relationships when consuming public transportation resources 104 by influencing individual decision-making related to transit timing and routes. The DSS 100 may utilize incentives and novel user interfaces to display alternative transit options that are not necessarily optimal but represent an improvement in terms of both self-interest and the public interest.

The DSS 100 may be configured to depict how transit alternatives impact other riders that have decided not to compete with the individual user for the public transportation resources 104. The DSS 100 may further depict the likelihood that other commuters will help the individual user in the future. The DSS 100 may be configured to provide the information in a user-friendly interface so that commuters 110 can easily interpret the impact of their decisions. The ease of generating and interpreting the impacts may encourage commuters 110 to collaborate and benefit the public transportation system 102 as a whole.

Figure 2:
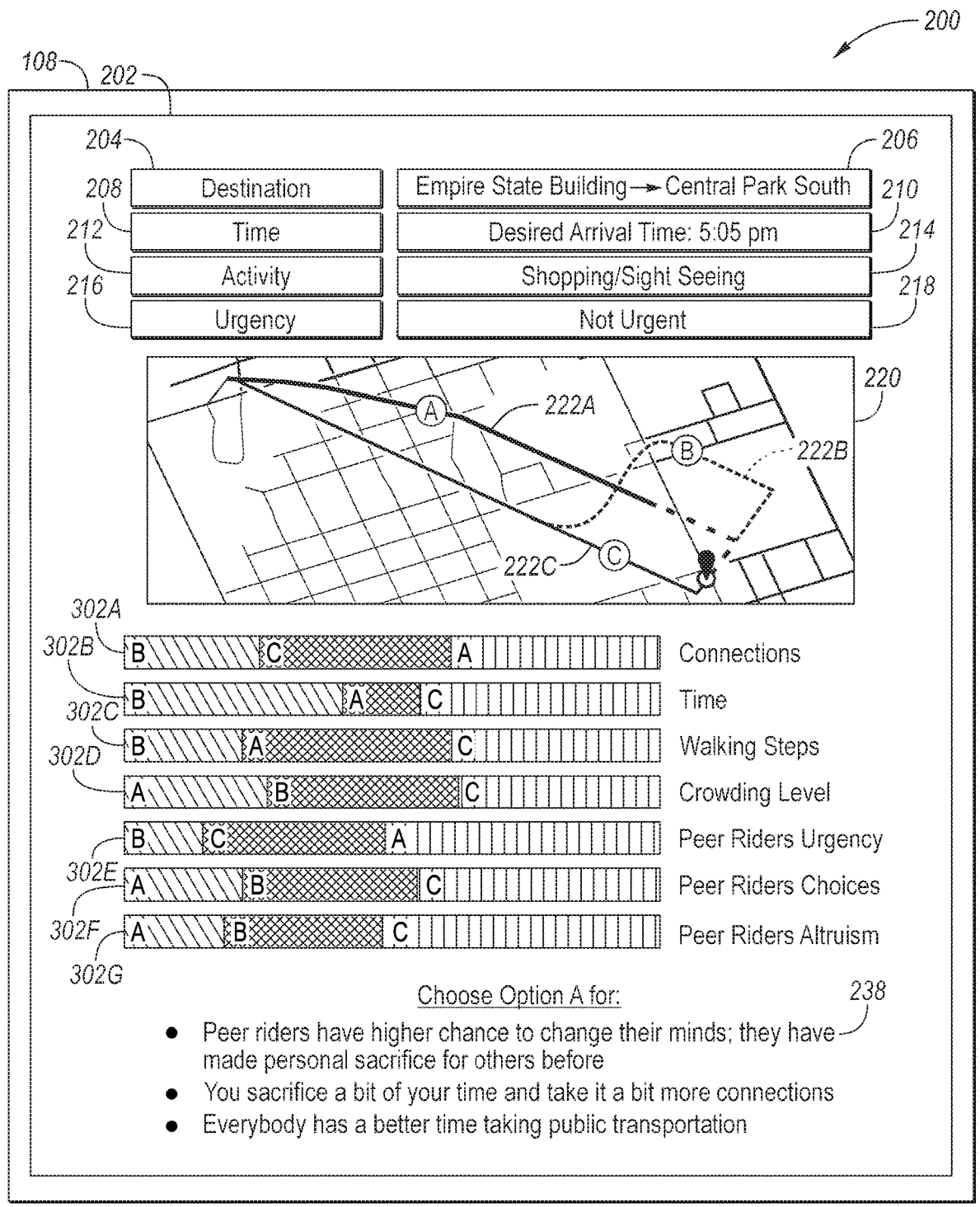
FIG. 2 depicts an example of a user interface for interfacing with the decision-support system.

FIG. 2 depicts a first example of the user interface 200 that may be displayed on a screen 202 of the mobile device 108. A commuter 110 may initiate a search for public transportation options for a trip. The user interface 200 may facilitate data entry modes for entering information via a touchscreen or other input mechanisms. Data entered using the user interface 200 may be used to provide decision support regarding public transit options. The entry modes for entering data may vary depending on the configuration. The entry modes may vary with the operating system present on the mobile device 108. A program/application that is programmed to implement the user interface 200 may be loaded and executed on the mobile devices 108.

The user interface 200 may include a map display field 220 that is configured to display a map. The map may include the present location of the mobile device 108 and areas proximate the present location. The map display field 220 may be configured so that the map image may be scrolled in different directions to expose additional map images. Map information may be stored in memory of the mobile device 108 and/or may be loaded from the application server 116 or another server. The map display field 220 may include zoom features to expand or compress the amount of area covered by the map.

The user interface 200 may provide an interface for the commuter 110 to input a destination. The user interface 200 may display a source/destination field 206 that displays the presently configured source and destination. The user interface 200 may include a destination entry selector 204 that is configured to permit the rider 110 to enter a source location and/or a destination location. For example, the destination entry selector 204 may be a virtual button created at a location on the touchscreen. The commuter 110 may select the destination entry selector 204 by touching the corresponding screen location. In response to touching the destination entry selector 204, a source/destination entry mode may be entered. The entry mode may cause a keyboard to be displayed for entering the information. Entry of the source and destination may also be accomplished by touching locations on a map displayed in the map display field 220 while in the entry mode. Destination entry may also be achieved by presenting location information from appointment entries from a calendar application. The entry mode may cause a list of previous destinations to be displayed for selection by the commuter 110.

The user interface 200 may provide an interface for the commuter 110 to enter a desired arrival time at the destination. The user interface 200 may display a time entry selector 208 that is configured to permit the rider 110 to enter a desired arrival time. For example, the time entry selector 208 may be a virtual button created at a location on the touchscreen. The user interface 200 may include an arrival time field 210 that displays the presently configured arrival time. The commuter 110 may select the time entry selector 208 by touching the corresponding screen location. In response to touching the time entry selector 208, an arrival time entry mode may be entered. The entry mode may cause a keyboard to be displayed for entering information. In some configurations, the entry mode may display a scrolling interface for entering the desired arrival time. The arrival time entry may also be achieved by presenting appointment information from the calendar application.

The user interface 200 may provide an interface for the commuter 110 to enter an activity description associated with the trip. The user interface 200 may display an activity entry selector 212 that is configured to permit the rider 110 to enter an activity type. For example, the activity entry selector 212 may be a virtual button created at a location on the touchscreen. The user interface 200 may include an activity display field 214 that is configured to display the presently selected activity type. The commuter 110 may select the activity entry selector 212 by touching the corresponding screen location. In response to touching the activity entry selector 212, an activity entry mode may be entered. The entry mode may cause a keyboard to be displayed for entering information. The entry mode may cause a menu or list of predefined and/or custom-defined activities to be displayed. The commuter 110 may scroll through the list and select one of the displayed activities. As an example, the list of activities may include, but is not limited to, shopping, home, work, sight-seeing, medical appointment, and social visit.

The user interface 200 may provide an interface for the commuter 110 to enter a level of urgency associated with the trip. The user interface 200 may display an urgency entry selector 216 that is configured to permit the commuter 110 to enter an urgency level. For example, the urgency entry selector 216 may be a virtual button created at a location on the touchscreen. The user interface 200 may include an urgency display field 218 that is configured to display the presently selected urgency level. The commuter 110 may select the urgency entry selector 216 by touching the corresponding screen location. In response to touching the urgency entry selector 216, an urgency entry mode may be entered. The entry mode may cause a keyboard to be displayed for entering information. The entry mode may cause a menu or list of predefined urgency levels to be displayed. The rider 110 may scroll through the list and select one of the displayed urgency levels. The list of urgency levels may include, but is not limited to, urgent and not urgent. In some configurations, the urgency level may be entered as a numeric value (e.g., 1-10).

Information entered via the user interface 200 may be transferred to the application server 116 for additional processing. The application server 116 may receive data from each of the commuters 110 and aggregate the data to determine overall trends. The application server 116 may store the data in the database 124 for ongoing use. The data described may be used to generate routing options for each of the commuters 110.

Entry of the source and destination may trigger the determination of the public transit options. Determination of public transit options may be performed automatically in response to the source and destination being entered or may be initiated by the commuter 110 by touching a route request selector (not shown). At least one of the application server 116 or the mobile devices 108 may be programmed to determine one or more public transit options between the source and destination locations. For example, the DSS 100 may be configured to provide three routing options whenever possible. The user interface 200 may be configured to display the routing options 222 in the map display field 220. The routing options 222 may include routes that include different modes of public transportation. In addition, the routing options 222 may define different paths between the source and destination locations. In the example, a first routing option 222A, a second routing option 222B, and a third routing option 222C are displayed in the map display field 220. Each of the routing options 222 may include corresponding information such as duration, arrival time, distance, modes of public transit used, and walking distance. The user interface 200 may be configured such that when the commuter 110 touches one of the routing options 222, a pop-up window is displayed that provides additional details about the selected routing option. For example, a trip requiring connections may be configured to show details of each segment of the trip.

The user interface 200 may be configured to display information about each of the routing options 222 to aid in the decision process. Some of the displayed information may provide specific details about each of the routing options 222. The information may be graphically displayed in a manner that shows the relative magnitude of decision factor parameters for all the routing options 222. The display information may be configurable such that the commuter 110 may configure the user interface 200 to display selected information. For example, a commuter 110 that relies on a subset of possible decision factors to make decisions may be able to configure the display to show information related to only those decision factors. The information may be graphically displayed in a manner that clearly shows preferred routing options based on different decision factors to help commuters 110 choose a public transit option. The user interface 200 may be further configured to display information that promotes cooperation among commuters 110 and efficiency of the public transportation system 102. The display information for each decision factor may be designed to allow the commuters 110 to easily assess the merits and compromises for of each of the routing options 222.

Figure 3:
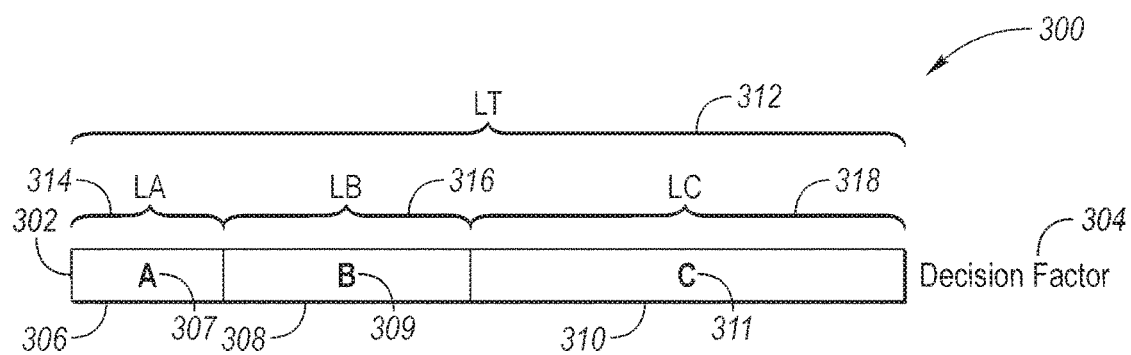
FIG. 3 depicts an example of a display element for presenting decision factors considered by the decision-support system.

FIG. 3 depicts a possible display element configuration 300 for a decision factor. A display element 302 may be depicted as a fixed-length bar on a display screen. The display element 302 may define a segment for each of the routing options that are presented. The segments may divide the fixed bar into several segments that is that same as the number of routing options or alternatives. For example, when three routing options are presented, the display element 302 may include three segments. The segments may be distinguished from one another by using colors, patterns and/or labels. Associated with each display element 302 may be a descriptive label 304 that describes the decision factor associated with the display element 302. Each decision factor may be associated with a parameter value that may vary in value for each of the routing options 222.

A first segment 306 may be defined that includes a first label 307. The first label 307 may be configured to identify a routing option that is associated with the first segment 306. The first label 307 may also be configured to display a value associated with the decision factor for the associated routing option. The first segment 306 may be the left-most segment within the display element 302. The first segment 306 may represent information regarding the routing option that is determined to be a preferred or suggested alternative with respect to the corresponding decision factor. The first segment 306 may be colored green.

A second segment 308 may be defined that includes a second label 309. The second label 309 may be configured to identify the routing option that is associated with the second segment 308. The second label 309 may also be configured to display a value associated with the decision factor for the associated routing option. The second segment 308 may be adjacent and to the right of the first segment 306. The second segment 308 may represent information regarding the routing option that is determined to be next preferred alternative with respect to the corresponding decision factor. The second segment 308 may be colored orange.

A third segment 310 may be defined that includes a third label 311. The third label 311 may be configured to identify the routing option that is associated with the third segment 310. The third label 311 may also be configured to display a value associated with the decision factor for the associated routing option. The third segment 310 may be adjacent and to the right of the second segment 308. The third segment 310 may represent information regarding the routing option that is determined to be next preferred alternative with respect to the corresponding decision factor. The third segment 310 may be colored red. When there are three routing options, the display element 302 may contain three segments. The third segment 310 may be referred to as the right-most segment. When there are more than three routing options, additional segments may be displayed in a similar manner.

The display element 302 depicted is in a horizontal format. However, the display element 302 could be presented alternatively in a vertical format. The corresponding segments may then be referred to in terms such as bottom-most and top-most segments. In addition, the relevance of the segments could be defined in the reverse direction such that the right-most segment represents the suggested or preferred alternative for the corresponding decision factor.

The relative size of the first segment 306, the second segment 308, and the third segment 310 may be indicative of the incremental change in the associated decision factor parameter between the corresponding routing options. The display element 302 may be characterized by a total length, LT 312, that defines the overall length of the display element 302. The total length, LT 312, may be associated with a specific value or percentage (e.g., 100%). The value associated with the total length, LT 312, may be the value of the corresponding decision factor parameter for the least preferred routing option. In some configurations, the value associated with total length, LT 312, may be a sum of the associated decision factor parameter values for all the routing options 222.

The first segment 306 may be characterized by a first length, LA 314. The first length, LA 314, may be indicative of a relative magnitude of the associated parameter value for the corresponding routing option. The first length, LA 314, may be defined as a percentage of the total length, LT 312. The second segment 308 may be characterized by a second length, LB 316. The second length, LB 316, may be indicative of a relative magnitude of the associated parameter value for the corresponding routing option. The second length, LB 316, may be defined as a percentage of the total length, LT 312. The third segment 310 may be characterized by a third length, LC 318. The third length, LC 318, may be indicative of a relative magnitude of the associated parameter value for the corresponding routing option. The third length, LC 318, may be defined as a percentage of the total length, LT 312.

One way to determine the relative segment lengths may be to consider the least optimal or least preferred value for the corresponding decision factor as 100% of the bar length. For the display element 302, the parameter value associated with the least preferred routing option may define the 100% value. For example, if the parameter values for the routing options are 5, 3, and 1, the least optimal value is 5 (assuming the highest value is least preferred). The value 5 may represent the total length, LT 312, or 100% of the bar length. Assuming a low value is preferred, the optimal value in the example is 1. The first length, LA 314, may be defined to be a length corresponding to ⅕ of the total bar length, LT 312. The second length, LB 316, may be determined from the deviation in value from the first segment value. In this case, the next lowest value is 3 which deviates from the first segment value by 2. The second length, LB 316, may be defined to be a length corresponding to ⅖ of the total bar length, LT 312. In the case of three segments, the third length, LC 318, may be defined as a length corresponding to the remaining percentage of the bar length (e.g., ⅖). Alternatively, the least optimal value is 5 which deviates from the second segment value by 2. The third length, LC 318, may be defined to be a length corresponding to ⅖ of the total bar length, LT 312.

In cases where two of the routing options have equal values for a parameter, the two routing options may be represented by the same segment. In such a case, the corresponding label may include reference to both routing options. In the case of three routing options, one of the segments may be labeled with the routing options that are equal and the display element may only display two segments.

Another method of assigning the relative segment lengths may be to sum the decision factor parameter values of all the routing options. The total length, LT 312, then corresponds to the summation value for all the routing options. The relative percentage of each of the segments may then be defined by the quotient of the parameter value associated with the segment and the summation value. Using the same example from above where the parameter values are 5, 3, and 1. A value of 9 represents the total length, LT 312. The first length, LA 314, may be defined to be defined to be a length corresponding to ⅑ of the total bar length, LT 312. The second length, LB 316, may be defined to be a length corresponding to ⅜ of the total bar length, LT 312. The third length, LC 318 may be defined to be a length corresponding to ⅝ of the total bar length, LT 312. This method can also be applied when the preferred value is the largest value.

The display element 302 may be configured so that the left-most segment identifies the preferred routing option for the corresponding decision factor. This facilitates identification by the commuter 110 of the preferred route based on the corresponding decision factor. The user interface 200 may present a display element 302 for one or more decision factors. The number and specific decision factors may be user configurable.

The relative lengths of the segments may be intended to communicate the relative differences between the associated routing options for a given decision factor. The relative lengths of the segment may visually communicate the relative differences between the routing options 222. The relative lengths of the segments may represent the magnitude of the differences between the routing options 222. The left-most segment (e.g., first segment 306) may represent the preferred or suggested alternative for a given parameter. The preferred option may be associated with the largest or smallest value depending on the particular decision factor. The remaining segments may indicate the relative change in the parameter value for the remaining route options. A small relative segment size may indicate that the associated routing option does not differ greatly from the more preferred option represented by the segment immediately to the left. That is, there may only be a small penalty for not selecting the routing option represented by the segment immediately to the left. A large relative segment size may be indicative of a large penalty. This allows a commuter 110 to quickly visually process the information regarding the routing options 222.

The user interface 200 may include one or more display elements 302 to communicate information about various route related decision factors. Referring again to FIG. 2, the user interface 200 may include a connections display element 302A. The connections display element 302A may graphically depict information about the number of connections or transfers for each of the routing options 222. The number of segments may be equal to the number of routing options 222 that are presented. For example, FIG. 2 presents three routing options 222 that will generally result in three segments for each of the display elements 302. The segments may be described as a left-most segment, a middle segment, and a right-most segment. Although described with reference to three segments, the description can be logically extended to configurations having more routing options. The segments in the connections display element 302A may be used to display information regarding the number of connections associated with each of the routing options 222.

The routing option associated with the left-most segment may be the routing option having the least number of connections. In the example, the left-most segment is labeled to indicate that routing option 222B has the least number of connections. The middle segment may be adjacent to and to the right of the left-most segment. The routing option associated with the middle segment may be the routing option having the second least number of connections. That is, the routing option associated with the middle segment has more connections than the routing option associated with the left-most segment. In the example, the middle segment is labeled to indicate that routing option 222C has the second least number of connections.

The third segment may be to the right of and adjacent to the middle segment. In an example with three routing options, the third segment may be the right-most segment within the bar. The routing option associated with the third segment may be the routing option having the greatest number of connections. That is, the routing option associated with the third segment has more connections than the routing options associated with the left-most segment and the middle segment. In the example, the third segment is labeled to indicate that routing option 222A has the greatest number of connections.

In the case of the connections display element 302A, the left-most segment identifies the routing option that is preferred or suggested based on having the least number of connections. The relative lengths of the segments may be indicative of the number of additional connections associated with the other routing options.

The user interface 200 includes additional display elements 302 that may be interpreted in a similar manner as described with respect to the connections display element 302A. The user interface 200 may be configured to include a time display element 302B. The time display element 302B may graphically depict information about the expected amount of time to complete the trip for each of the routing options 222. The left-most segment of the time display element 302B may identify the routing option that requires the least amount of time. The right-most segment may identify the routing option that requires the greatest amount of time.

The length of the segments of the time display element 302B may be indicative of the amount of time required for each of the routing options 222. The segment lengths may be indicative of the incremental amount of time required for each of the routing options 222. A short segment length may be indicative of a small time penalty for selecting the corresponding routing option when compared to the routing option corresponding to the segment immediately to the left.

The user interface 200 may be configured to include a walking distance/steps display element 302C. The walking distance/steps display element 302C may graphically depict information about the walking distance or number of steps required for each of the routing options 222. The routing option associated with the left-most segment may be the routing option having the least number of steps and/or the least walking distance. The length of the segments may be indicative of an incremental number of steps or walking distance incurred if the corresponding routing option is selected.

The user interface 200 may be configured to include a crowding level display element 302D. The crowding level display element 302D may graphically depict information about the crowding level for each of the routing options 222. The routing option associated with the left-most segment may be the routing option having the lowest crowding level. The crowding level may be indicative of the capacity of the transit resources 104 for each of the routing options 222. In some configurations, the crowding level may be expressed as a percentage of seating capacity. For example, a crowding level of 100% may indicate that all seats will be taken. The crowding level may exceed 100% for transit options that permit standing. The length of the segments for the crowding level display element 302D may be indicative of the incremental amount of crowding level for the corresponding routing options.

The user interface 200 may be configured to include a peer rider urgency display element 302E. The peer rider urgency display element 302E may graphically depict information about the urgency level of peer riders for each of the routing options 222. The routing option associated with the left-most segment may be the routing option in which peer riders have the lowest urgency. The peer riders for a routing option may be defined as those riders or commuters that have been presented the routing option and/or are expected to select the routing option. The peer rider urgency may be an aggregated measure of the urgency level for all potential riders for each option. The peer rider urgency level may be an average of the selected urgency level of all the peer riders. The peer rider urgency level may be expressed as the proportion of commuters that selected an urgency level of urgent. The peer rider urgency level may also factor in the selected activity level of each commuter.

The peer rider urgency level may be expressed as a percentage of peer riders that must reach their destination within a predetermined time (e.g., twenty minutes) of an estimated arrival time for a given routing option. For example, the DSS 100 may have provided route A as an option to ten other riders that are traveling to the same destination. The DSS 100 may provide each of the riders an estimated arrival time. The peer rider urgency may be expressed as the percentage of riders that must reach the destination no later than a predetermined time after the estimated arrival time. Each rider may desire to reach the destination before the desired arrival time. The desired arrival time may be compared to the estimated arrival time. The peer rider urgency level may be expressed as the percentage of riders for which the difference between the desired arrival time and the estimated arrival time is less than a predetermined difference.

The left-most segment may represent a recommended routing option that is a routing option for which the peer riders have the lowest urgency level (e.g., least urgency level). That is, selecting this route option has the least impact on other riders that may have a high urgency level. When considering the overall commuter experiences, the option with the lowest urgency level of peer riders may be the preferred or suggested option. This may encourage commuters 100 to select a less optimal route that does not impact peer riders whose trip has greater urgency. The right-most segment may represent the routing option for which the peer riders have the highest urgency level.

The user interface 200 may be configured to include a peer rider choice display element 302F. The peer rider choice display element 302F may graphically depict information about the available public transit choices of peer riders for each of the routing options 222. The left-most segment may be associated with the routing option for which peer riders have more choices of routes. For example, in some situations, there may be limited route options to transport peer riders to a destination. Route options may be limited due to route schedules, peer rider time demands, and/or peer rider urgency levels. The DSS 100 may be configured to identify a preferred route as the route for which peer riders have more choices. By selecting this route, the commuter has less impact on peer riders as the commuter is not competing for transit resources for which peer riders have few other choices. This promotes a more cooperative transit environment. One of the options may be distinguished as the recommended option which may be the public transit route option that has a greatest number of alternative transit choices available to the other commuters expected to travel.

The user interface 200 may be configured to include a peer rider altruism display element 302G. The peer rider altruism display element 302G may graphically depict information about the altruism level of peer riders for each of the routing options 222. The peer rider altruism level may be estimated by monitoring the frequency at which a commuter selects a route that promotes cooperative behavior. For example, a commuter altruism level may increase when the commuter selects a route that is not the fastest route. The commuter altruism level attempts tom measure cooperative behavior of each commuter 110. Commuter selections compared to recommendations may be monitored to maintain a history of commuter behavior. The left-most segment may be associated with a preferred or recommended routing option for which peer riders have a lowest altruism level (e.g., least measure of cooperativeness). That is, the preferred route may the one that does not impact others who have behaved cooperatively in the past. A commuter that always takes the fastest route regardless of other factors may be assigned a low altruism level. The peer rider altruism display element 302G attempts to identify a route selection that promotes cooperation among commuters.

The display elements of the user interface 200 provide information to inform commuters about the routing options 222. The display elements may be designed to help the commuter understand how the different choices affect the public transportation system 102. In addition, the display elements provide information about levels of cooperation with peer riders. This information can aid in understanding the routing options. Each of the display elements 302 may suggest a different preferred routing option. The decision factors may not be optimized by any one route and the display elements 302 may identify which routes are preferred based on each decision factor. The commuter 110 may determine which criteria is the most relevant and decide accordingly.

The mobile device 108 includes a computing system that is configured to operate the user interface 200. The computing system may be programmed to present the public transit route options 222 for the commuter 110 on a display. At least one display element may be configured to communicate relative values of a parameter corresponding to a decision factor that measures an expected impact on other commuters caused by the commuter selecting each of the public transit route options. The computing system may be further configured to identify one of the public transit route options as a recommended option for the decision factor. The recommended option may be highlighted or distinguished from the other options. The recommended option may be identified as the left-most segment. The recommended option may be identified by a colored segment being a predetermined color (e.g., green) or pattern.

FIG. 3 depicts an alternative display element configuration 400 for a decision factor. A display element 402 may be depicted as an axis on a display screen (e.g., x-axis). The display element 402 may depict an axis of fixed length. The display element 402 may define a marker for each of the routing options 222 that are presented. The markers may divide the axis into segments. The markers may be distinguished from one another by using colors and/or icons. Associated with each display element 402 may be a descriptive label 404 that describes the decision factor associated with the display element 402. Each decision factor may be associated with a parameter value that may vary in value for each of the routing options 222. The display element 402 may be an axis that defines an origin and defines markers displaced from the origin that represent each of the public transit route options. The markers may be displaced from the origin based on values associated with the decision factor for each of the public transit route options.

A first marker 406 may be defined that is identified with a first label 407 (A, V1). The first label 407 may include a route identifier (e.g., A, B, C) and a value of the corresponding decision factor parameter for the associated route. The value may be expressed as a numerical value in units related to the decision factor parameter. For some decision factors, the value may be expressed as a percentage value. The first marker 406 (or left-most marker) may identify the routing option that is determined to be a preferred or suggested alternative with respect to the corresponding decision factor.

A second marker 408 may be defined that is identified with a second label 409 (B, V2). The second label 409 may include a route identifier (e.g., A, B, C) and a value of the corresponding decision factor parameter for the associated route. The value may be expressed as a numerical value in units related to the decision factor parameter. For some decision factors, the value may be expressed as a percentage value. The second marker 408 (or middle marker) may identify the routing option that is determined to be the next preferred or suggested alternative with respect to the corresponding decision factor.

A third marker 410 may be defined that is identified with a third label 411 (C, V3). The third label 411 may include a route identifier (e.g., A, B, C) and a value of the corresponding decision factor parameter for the associated route. The value may be expressed as a numerical value in units related to the decision factor parameter. For some decision factors, the value may be expressed as a percentage value. The third marker 410 (or right-most marker) may identify the routing option that is determined to be a least preferred or suggested alternative with respect to the corresponding decision factor. When there are three routing options 222, the display element 402 may contain three markers. Note that the display element 402 may be logically extended to more than three routing options.

The display element 402 is depicted in a horizontal format. However, the display element 402 could be presented similarly in a vertical format (e.g., a y-axis). The corresponding markers may then be referred to in terms such as bottom-most and top-most markers.

The display element 402 may graphically present the decision factor values along the axis. The display element 402 may be configured so that the values increase moving from left to right on the axis. The markers may be arranged based on the relative values of the corresponding decision factor parameter.

A distance between an origin 403 and the first marker 406 may be defined by a first length, LA 414. The origin 403 may represent a value of zero for the decision factor parameter value. The first length, LA 414, may be based on the decision factor parameter value of the routing option associated with the first marker 406. A distance between the origin 403 and the second marker 408 may be defined by a second length, LB 416. The second length, LB 416, may be based on the decision factor parameter value of the routing option associated with the second marker 408. A distance between the origin 403 and the third marker 410 may be defined by a third length, LC 418. The third length, LC 418, may be based on the decision factor parameter value of the routing option associated with the third marker 410.

The display element 402 may be configured with a variable scale to accommodate different parameter ranges for each of the decision factors. While the display element 402 may be of fixed length or size, the marker positions may vary based on the parameter range of the corresponding decision factors. For example, the largest of the parameter values may define a fixed position on the axis for the third marker 410. The fixed position may be toward the right side of the display element 402 so that most of the display element 402 will be utilized. The first marker 406 and the second marker 408 may be positioned based on the relative magnitudes of the associated values when compared to the value corresponding to the third marker 410. For example, if the value associated with the second marker 408 is one half the value of that associated with the third marker 410, the second marker 408 may be positioned halfway between the third marker 410 and the origin 403.

Figure 4:
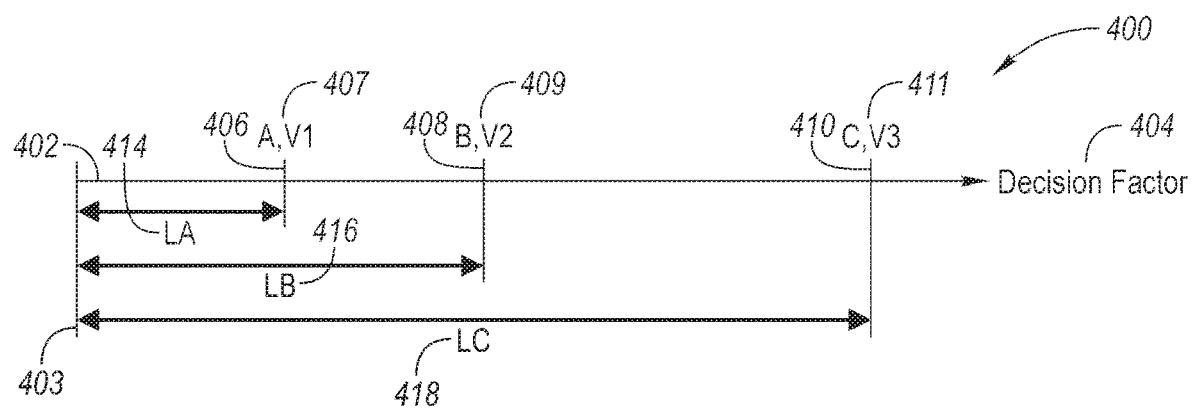
FIG. 4 depicts another example of a display element for presenting decision factors considered by the decision-support system.
Figure 5:
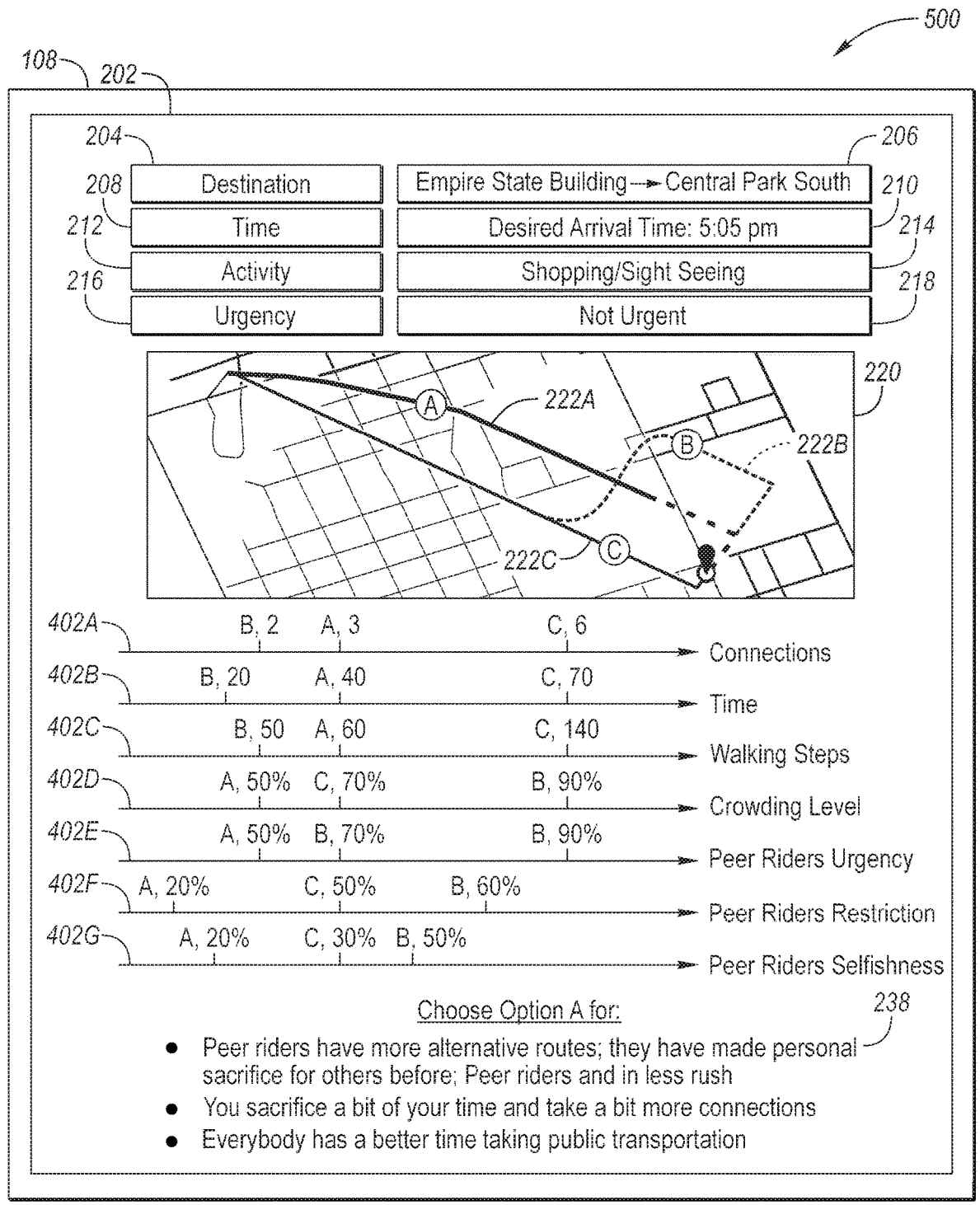
FIG. 5 depicts an example of an alternative user interface for interfacing with the decision-support system.

FIG. 5 depicts an example of a second user interface 500 that may be displayed on a screen 202 of the mobile device 108. The second user interface 500 may include similar elements as those described with respect to FIG. 2. Elements referenced with the same number may be described in the same manner as for FIG. 2 and the description is not repeated. The primary difference in the second user interface 500 is that the display elements for the decision factors utilize the display element 402 of FIG. 4.

The second user interface 500 may include one or more display elements 402 to communicate information about various trip related decision factors. Referring again to FIG. 5, the user interface 500 may include a connections display element 402A. The connections display element 402A may graphically depict information about the number of connections or transfers for each of the routing options 222. The number of markers may be equal to the number of routing options 222 that are presented. For example, FIG. 5 presents three routing options 222 that will generally result in three markers for each of the display elements 402. The markers may be described as a left-most marker, a middle marker, and a right-most maker. Although described with reference to three markers, the second user interface 500 can be logically extended to configurations having more routing options. The markers in the connections display element 402A may be used to display information regarding the number of connections associated with each of the routing options 222.

The routing option associated with the left-most marker may be the routing option having the least number of connections. In the example, the left-most segment is labeled to indicate that routing option 222B has the least number of connections (e.g., 2). The middle marker may be depicted to the right of the left-most marker. The routing option associated with the middle marker may be the routing option having the second least number of connections. That is, the routing option associated with the middle marker has more connections than the routing option associated with the left-most or first marker. In the example, the middle maker is labeled to indicate that routing option 222A has the second least number of connections (e.g., 3).

The third marker may be to the right of the second marker. In an example with three routing options, the third marker may be the right-most marker within the display element 402. The routing option associated with the third marker may be the routing option having the greatest number of connections. That is, the routing option associated with the third marker has more connections than the routing options associated with the left-most marker and the middle marker. In the example, the third marker is labeled to indicate that routing option 222B has the greatest number of connections (e.g., 6).

In the case of the connections display element 402A, the left-most marker may identify the routing option that is preferred or suggested based on having the least number of connections. The relative placement of the markers within the connections display element 402A may be indicative of an absolute value of the number of connections for each of the routing options 222.

The user interface 500 may be configured to include a time display element 402B. The time display element 402B may graphically depict information about the expected amount of time to complete the trip for each of the routing options 222. The left-most marker of the time display element 402B may identify the routing option that requires the least amount of time. The right-most marker may identify the routing option that requires the greatest amount of time.

The position of the markers of the time display element 402B may be indicative of the amount of time required for each of the routing options 222. The distance of the marker from the origin may be indicative of the amount of time required for each of the routing options 222.

The user interface 500 may be configured to include a walking distance/steps display element 402C. The walking distance/steps display element 402C may graphically depict information about the walking distance or number of step required for each of the routing options 222. The routing option associated with the left-most marker may be the routing option having the least number of steps and/or the least walking distance.

The user interface 500 may be configured to include a crowding level display element 402D. The crowding level display element 402D may graphically depict information about the crowding level for each of the routing options 222. The routing option associated with the left-most marker may be the routing option having the lowest crowding level. The crowding level may be determined as described previously herein.

The user interface 500 may be configured to include a peer rider urgency display element 402E. The peer rider urgency display element 402E may graphically depict information about the urgency level of peer riders for each of the routing options 222. The routing option associated with the left-most marker may be the routing option for which peer riders have the lowest urgency. The peer rider urgency level may be determined as described previously herein.

The left-most marker may represent the routing option for which the peer riders have the lowest urgency level. That is, selection of this route has the least impact on other commuters that may have a high urgency level. The right-most marker may represent the routing option for which the peer riders have the highest urgency level. In some situations, the right-most marker may correspond to the fastest route and may be preferred for those with a high urgency level.

The user interface 500 may be configured to include a peer rider restriction display element 402F. The peer rider restriction display element 402F may graphically depict information about the available public transit choices of peer riders for each of the routing options 222. The left-most marker may be associated with the routing option for which peer riders have more choices or less restrictions of routes. For example, in some situations, there may be limited route options to transport peer rider to a destination. Route options may be limited due to route schedules, peer rider time demands, and/or peer rider urgency levels. The DSS 100 may be configured to identify a preferred route as the route for which peer riders have fewer restrictions. By selecting this route, the commuter has less impact on peer riders as the commuter is not competing for transit resources for which peer riders have few other choices. This promotes a more cooperative transit environment.

The user interface 500 may be configured to include a peer rider selfishness display element 402G. The peer rider selfishness display element 402G may graphically depict information about a selfishness rating of peer riders for each of the routing options 222. The selfishness rating may be indicative of the percentage of peer riders that have considered the needs of others when selecting a transit option. The peer rider selfishness rating may be indicative of a percentage of peer riders that have changed their route selection based on recommendations provided. The peer rider selfishness rating may be estimated by monitoring how often a commuter selects a route that promotes cooperative behavior. For example, a commuter may demonstrate non-selfish behavior when the commuter selects a route that is not the fastest route. Commuter selections compared to recommendations may be monitored to maintain a history of commuter behavior. The left-most marker may be associated with the routing option for which the least percentage of peer riders that have previously made a personal sacrifice by not taking the shortest or fastest route. That is, the preferred route may be the route that does not impact others who have behaved cooperatively in the past. A commuter that always takes the fastest route regardless of other factors may demonstrate selfishness. The peer rider selfishness display element 402G attempts to identify a route selection that promotes cooperation among commuters.

The user interfaces (e.g., 200, 500) may be further configured to display cost information for each of the routing options 222. The user interfaces may further include an information field 238 that may be used for displaying additional explanatory information. For example, the information field 238 may be used to display information regarding the benefits of choosing a particular routing option. The information field 238 may be used to encourage selection of options that yield the optimal results for the public transportation system 102 as a whole.

Some of decision factors related to peer riders attempt to quantify the level of cooperativeness of the commuters 110. For example, the peer rider related display elements provide information on how the choices may affect other commuters. The DSS 100 may encourage route selections that maximize the cooperativeness among commuters. By knowing the urgency and restrictions of other commuters, the DSS 100 may facilitate cooperative behavior. In addition, knowing that other commuters have behaved cooperatively may encourage further cooperative behavior.

Figure 6:
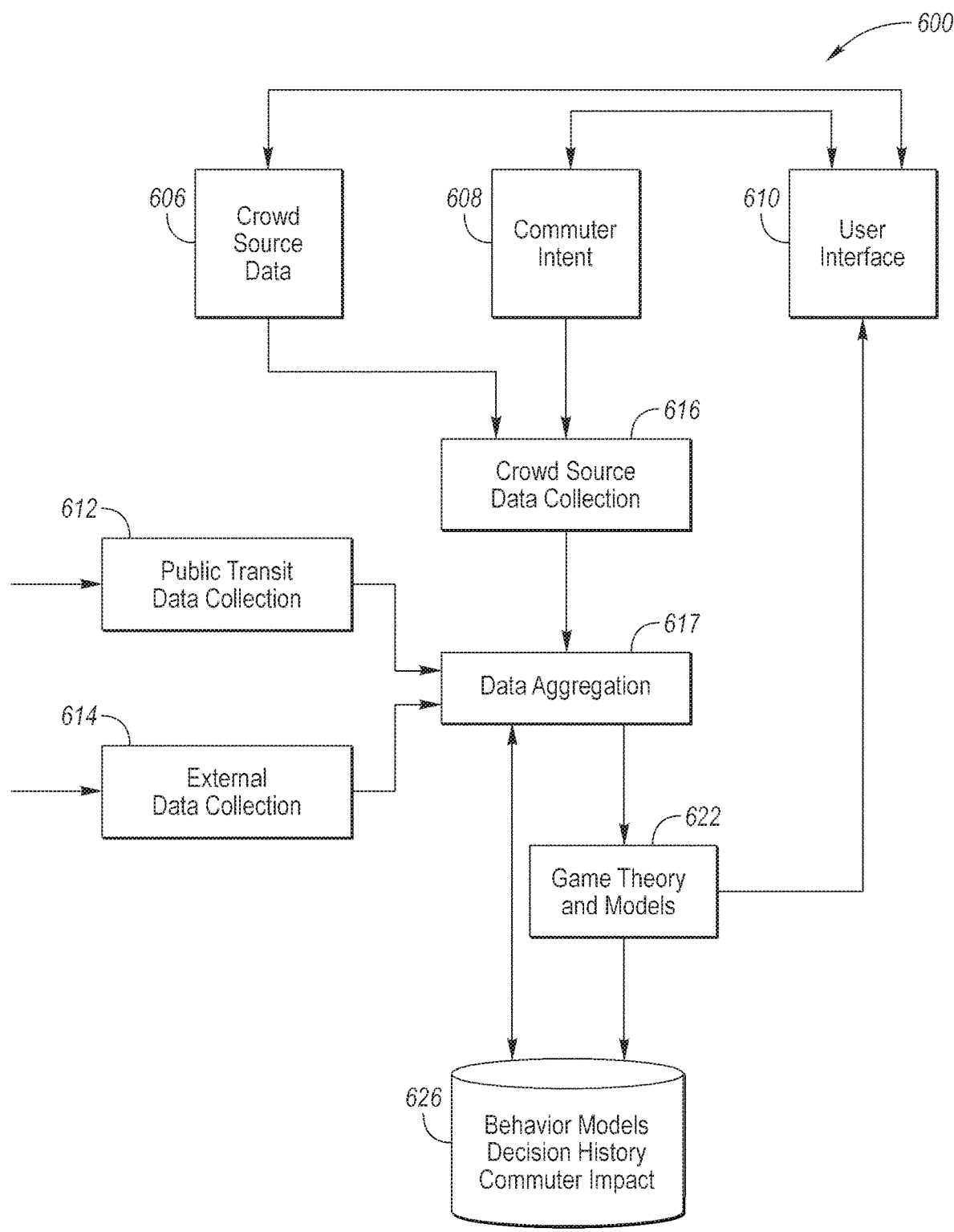
FIG. 6 is a block diagram of possible processes for implementing the decision-support system.

FIG. 6 depicts a process diagram 600 for the DSS 100 that may be representative of data flows and process blocks for implementing the DSS 100. The DSS 100 may be implemented by processes performed by the mobile devices 108 and/or processes performed by the application server 116. The computing system (e.g., application server 116 and/or mobile devices 108) may be programmed to generate public transit route options for the commuter based on at least one decision factor that estimates an expected impact on other commuters resulting from the commuter choosing each of the public transit route options. The computing system may be programmed to output, for display, values associated with the at least one decision factor to influence the commuter in making a route selection.

A crowdsource data process 606 may be configured collect and provide crowdsourced data such as location information associated with the commuter. The location information may be derived from a GPS sensor in the mobile device 108. The crowdsource data process 606 may also provide time information along with the location information. For example, time data may be used to compute wait times at a given location. In some configurations, the crowdsource data process 606 may facilitate self-reporting of the commuter location (e.g., touching current location on displayed map). The crowdsource data process 606 may also collect and provide additional data regarding the public transportation system 102. The crowdsource data process 606 may be configured to elicit data regarding crowd levels, operational status of public transit resources 104, weather, traffic conditions, causes of delays, vehicle cleanliness, and other factors that affect the commuter experience. The user interface 200 may provide display elements for inputting crowdsourced data in a fast and simple manner. Some crowdsourced data may be automatically generated as well.

A commuter intent process 608 may be configured to permit the commuter to enter and manage personal profile information and provide trip information. The commuter intent process 608 may be configured to generate and make available personal profile information of the commuter 110. Personal profile information may include personal travel needs and preferences of the rider. Personal information may be entered via the user interface 200 as discussed previously herein. In addition, each commuter 110 may maintain a personal profile. The personal profile may be maintained on the mobile device 108 and/or may be maintained in the database 124. The personal profile information may include information such as marital status, number of children, school schedule, and work schedule.

The commuter intent process 608 may be configured to enter trip-related information. For example, destination, time, trip type, and urgency data entered via the user interface 200 may be transferred to other processes for additional processing. The commuter intent process 608 may be configured to provide data related to the personal travel needs of the commuter 110. The commuter intent process 608 may collect data related to the intent of the commuter 110 for a given trip.

A user interface process 610 may be configured to implement and manage the user interface 200. Data entered via the user interface 200 may be received by the user interface process 610. The user interface process 610 may be configured to provide the user interface inputs to other processes. The user interface process 610 may be further configured to display information received from other processes.

The crowdsourced data provides useful inputs for managing the overall public transportation system 102. The DSS 100 may incorporate crowdsourced information into the decision-making process. Crowdsourced data may be used for generating and updating maps, predicting transit vehicle arrival times, collecting local residents sharing experiences, and collecting suggestions for public transit improvements. The crowdsourced data may be applied to improve public transportation rider experience for all commuters. Existing crowdsourcing work is focused on collaboration where riders share common interests. However, the public transportation system 102 may also include competitive aspects as commuters 110 are competing for transit options to satisfy their transportation needs. The DSS 100 incorporates crowdsourcing data that quantifies the competitive relationship between riders and leverages this competitive relationship to influence or change rider behavior, and thereby improve the rider experience on public transportation systems 102.

The crowdsource data process 606 and the commuter intent process 608 may exist for each of the commuters 110. A crowdsource data collection process 616 may be configured to receive crowdsourced data from other processes including the crowdsource data process 606 and the commuter intent process 608. For example, the crowdsource data process 606 and the commuter intent process 608 may be implemented on the mobile devices 108 of each of the commuters 110. The crowdsource data collection process 616 may manage communication with the mobile devices 108 that are participating in the DSS 100 to collect the crowdsourced data.

A public transit data collection process 612 may be configured to receive and process data from the public transportation system 102. For example, the public transit data collection process 612 may collect location information for public transit vehicles 104, schedule information, route information, and cost information. An external data collection process 614 may be configured to receive and process data from external sources. For example, the external data collection process 614 may monitor weather and traffic information from sensors or web-servers.

A data aggregation process 617 may be configured aggregate the data received from the various sources (e.g., crowdsourced, public transportation system, external sources). Data may be processed to assess crowding at various locations (e.g., public transport stations or stops). For example, the data aggregation process 617 may process the commuter location to determine crowd levels of the transit resource 104. Commuter intent data may be processed to ascertain overall transit demand for various routes and locations. The data may be processed to determine availability of public transportation resources 104 at various times and locations. The data may be processed to determine locations of public transportation resources 104 at any time. Data and information generated by the data aggregation process 617 may be stored in a local database 626 that represents non-volatile memory.

The data aggregation process 617 may further update parameters for the decision factors. For example, the data aggregation process 617 may update values indicative of commuter cooperativeness based on the received data. For example, a measure of cooperativeness associated with the commuter may be increased responsive to the commuter previously selecting a cooperative route. A cooperative route may be a route selection that is not necessarily preferred for the commuter but is preferred for the system as a whole. A cooperative route may be one that is identified or recommended based on the decision factors related to peer rider considerations (e.g., peer rider urgency level, peer rider alternative choices, and/or peer rider altruism/selfishness level). The measure of cooperativeness may be decreased when selecting a route that optimizes individual preferences such as a fastest route or least crowded route. The measure of cooperativeness may be balanced by commuter intent data. For example, the measure of cooperativeness may be maintained at a previous value responsive to the commuter indicated that a trip is urgent and selecting the fastest route.

A game theory/model application 622 may be configured to implement and execute one or more game theory algorithms to generate one or more route options. The game theory/model application 622 may be programmed to apply game theory to various aspects of the public transportation system 102 such as route planning, pricing, and safety. The game theory/model application 622 may incorporate different game models including Stackelberg game models, collaborative game models, and evolutionary game models to determine optimal actions (equilibriums) for all commuters 110 interacting with the public transit system 102. The game theory/model application 622 may be configured to apply game theory algorithms to provide incentives to riders of the public transport system to change behaviors to result in less competition of transport resources and provide a better transit experience for riders. The game theory/model application 622 may focus on promoting community-aware actions for the entire transit population through learning rider behavior and providing customized decision assistance instead of finding optimal actions for each individual commuter.

The game theory/model application 622 may generate routing options for the commuter 110 that optimize the experience of each commuter considering factors such as time, number of connections, walking distance, and crowding levels. The game theory/model application 622 may generate routing options for the commuter 110 that optimize the experiences of peer riders considering factors such as urgency levels, alternative choices, and altruistic behavior.

The game theory/model application 622 may model rider behavior as an evolutionary game and incorporate information regarding past rider interactions and generate an equilibrium solution for each rider/commuter. The equilibrium solution may be the solution that provides the best transit option responsive to the decisions and choices of other commuters. The DSS 100 may also utilize incentives and user interfaces to generate and display alternative transit options that are not "equilibriums" but represent an improvement in terms of both self-interest and the public interest. The game theory/model application 622 may be configured to generate model parameters for various aspects of the public transportation system 102. The game theory/model application 622 may generate and maintain behavior models, decision histories and impact assessments of rider decisions on public resources and other riders' experiences over time. Behavior models may be configured to model the responses of individual commuters as well as overall behavior of commuters using the system. The game theory/model application 622 may generate and provide transit options to the commuters 110 that addresses the impact on commuters 110 who have taken altruistic alternatives and the potential future benefit from other commuters 110 for each transit option.

The game theory/model application 622 may determine the decision factors for display via the user interface 200. For each routing option, the game/theory model application 622 may compute the various decision factor parameters. For example, the game/theory model application 622 may determine the number of connections, time, and walking steps/distance for each of the proposed routing alternatives. The game/theory model application 622 may further compute the peer rider urgency, peer rider choices/restrictions, and peer rider altruism/selfishness values for each of the proposed routing alternatives. Further, the game/theory model application 622 may incorporate these decision factors into the selection of the proposed routing alternatives to generate routing options that may optimize one or more of these decision factors.

Data generated by the game theory/model application 622 may be stored in the local database 626. Information that is stored in the local database 626 may include behavior model structures and parameters, decision history information for the commuters 110, and commuter impact data. The information may be generated by the game theory/model application 622 and/or the data aggregation process 617. Data stored in the local database 626 may be retrieved for use by other processes.

The game theory/model application 622 may be configured to analyze and update solutions or equilibriums that are generated. For example, solutions or equilibriums that are generated may be analyzed with respect to corresponding commuter decisions to determine the effectiveness of the generated equilibrium. The game theory/model application 622 may further be configured to monitor parameters being optimized to determine the impact of system operation. For example, actual crowding levels and transit times may be monitored and compared to those predicted by the models and algorithms. Large deviations between the predicted and actual values may be indicative of areas where the models could be improved.

Game theory algorithms are applicable in that the algorithms attempt to provide an optimal strategy taking into consideration the strategies taken by other players (e.g., commuters). Game theory algorithms may monitor the actions previously taken by commuters to develop options that promote cooperation in the future. The game theory/model application 622 may attempt to provide a transit strategy for each commuter that considers the transit options chosen or likely to be chosen by other commuters interacting with public transportation system 102. The game theory/model application 622 may process the behavior model and decision history of the commuters 110 to learn and predict likely choices of the commuters 110.

The game theory/model application 622 may also factor in the personal travel needs and preferences of each of the riders 110 that may vary with trip context. For example, the urgency of the rider 110 may be different for a shopping trip than for traveling to an important meeting or commuting to work. The personal travel needs and preferences may vary with the personal profile of the rider 110. For example, a rider with children waiting at home may have more urgency than a single person without family constraints. This information may be aggregated from each rider and processed by the DSS 100.

The game theory/model application 622 may generate and select the routing options 222 by optimizing experiences of the commuter 110 and peer riders. Peer riders may be other riders that are using and about to use the public transportation system 102. With respect to each commuter 110, the DSS 100 may generate routing options that consider the time taken to the destination, the number of connections, the walking distance, and the estimated crowding level of a route. With respect to the peer riders, the DSS 100 may determine an urgency level, alternative choices, and altruistic behavior (e.g., how many times riders have change their routes for the convenience of others). The game theory/model application 622 may generate routing options that consider the urgency level, alternative choices, and altruism/selfishness level of peer riders. As applied-game theory shows, by displaying such options and corresponding information, it is expected that rider 110 may change their routes for their own personal benefit and for the benefit of others. The DSS 100 may incorporate crowdsourcing concepts to encourage collaboration among riders. For example, it is expected that commuters will not always choose the fastest route if more information is presented. Commuters may opt to select more cooperative route selections when they are presented with data regarding other commuters. The decision factors related to other commuters helps the commuter to select more cooperative options.

Figure 7:
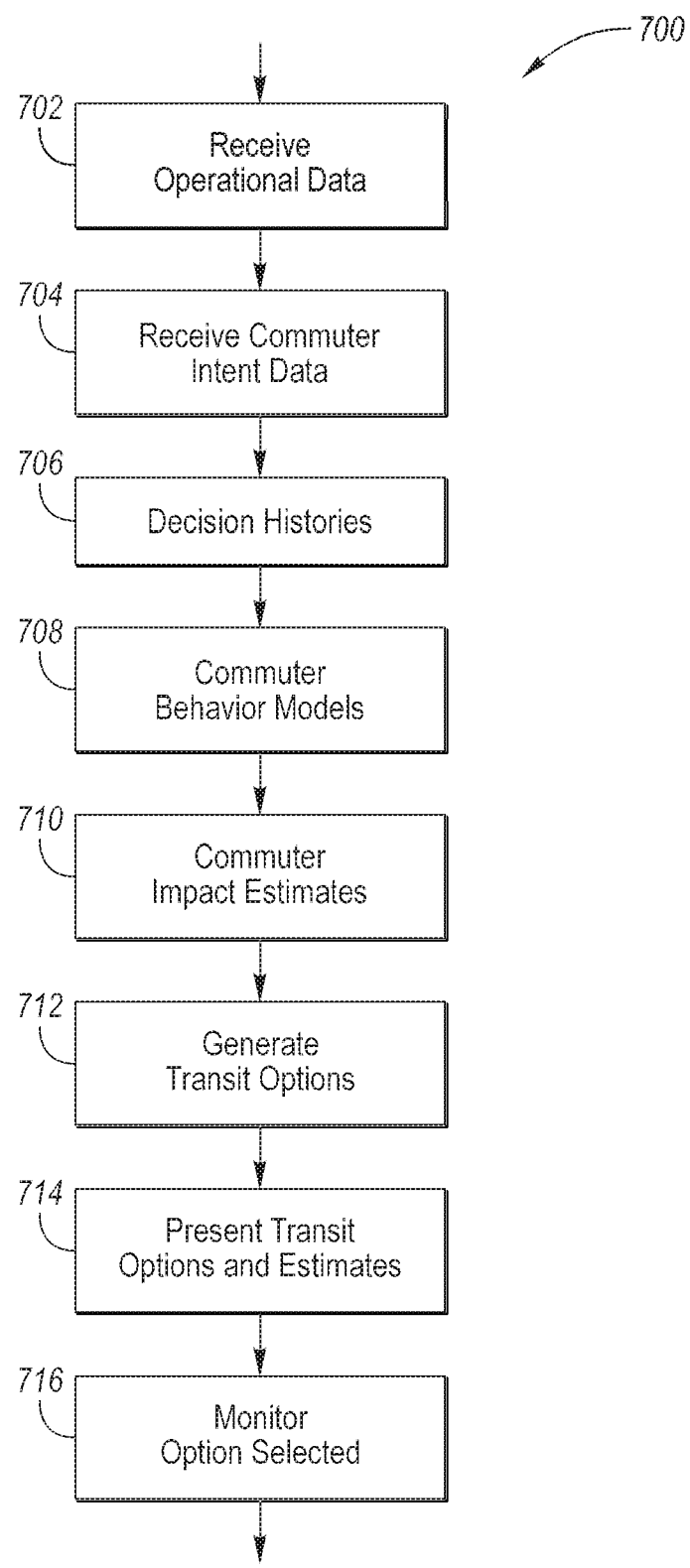
FIG. 7 is a flowchart of a possible set of operations for implement the decision-support system.

FIG. 7 depicts a flowchart 700 of a possible sequence of operations that may be performed by the DSS 100. For example, the operations may be translated into instruction to be executed on one or more computing systems (e.g., mobile devices 108 and/or application server 116).

At operation 702, the DSS 100 may receive operational data from the various sources. The data sources may include the mobile devices 108, transit server 106, the transit resources 104, and the external systems and sensors 118. The data may include the crowd sourced data, public transportation system data, and external system and sensor data that impacts the public transportation system 102. The DSS 100 may utilize information from commuters 110 regarding arrival and departure times of public transit vehicles and public transit routes. The DSS 100 may collect crowdsourced information from commuters 110. The crowdsourced information may include public information and personal information. Public information may include data that affects the operation and arrival/departure times of public transit vehicles. The public transit server 106 may transfer information related to the public transit vehicles 104. The external systems and sensors 118 may transfer information related to conditions that may affect performance of the public transit system 102. For example, conditions causing traffic delays such as bad weather, construction, accidents, parades/protests/events and road or route closures.

At operation 704, the DSS 100 may receive commuter intent data from each of the commuters 110. For example, commuter intent data may be entered via the user interface of the mobile devices 108. The commuter intent data may include data from all the commuters 110 that are interacting with the public transportation system 102. The commuter intent data may represent the travel desires of the commuters 110 including any constraints and/or preferences. The DSS 100 may utilize information from commuters 110 regarding commuter travel plans and preferences.

At operation 706, commuter decision histories may be checked and updated based on the commuter inputs. The DSS 100 may retrieve decision history data from commuters with the same or similar destination. The decision history data may reflect the altruism and/or selfishness level of the commuters that are expected to be riding at the same time. The data may be aggregated and/or averaged to provide decision parameters for the routing algorithm.

At operation 708, commuter behavior models may be processed and updated. The commuter behavior models may model and predict commuter responses based on the current set of input data. The commuter behavior models may predict responses of peer riders that are interacting with the public transportation system 102. The commuter behavior models may be updated based on the decision histories of the commuters.

At operation 710, commuter impact estimates may be generated from the commuter behavior models. The commuter impact estimates may quantify the effect/impact of the commuter decisions on the transit system and the experiences of other commuters.

At operation 712, the data may be processed to generate transit options for the commuter. The DSS 100 may implement game theory models to determine the preferred transit options to each of the commuters as described previously herein. The DSS 100 may generate at least one public transit route option for the commuter based on at least one decision factor that is based on a commuter profile and a commuter intent for a proposed commute. For example, the DSS 100 may generate at least one routing option that is optimal or preferred by the commuter 110 such as a fasted time or least crowded option.

The route generation operation may incorporate the operational data into the routing algorithms to predict arrival times and optimize routes for riders. The route generation operation may be configured to integrate past and present transit data with the current intent of riders to predict travel time, comfort, and cost of various transit options. Timing and route information may be associated with each of the transit options 222. Past and present transit data may include locations of public transit vehicles, road closures, and road conditions. The past and present transit data may be derived from publicly available sources and rider-generated sources. Publicly available sources may include schedules provided by the transit authorities and websites operated by the transit authorities. Rider-generated sources may include crowd-sourced data collected from riders. For example, location data may be collected from the mobile devices 108 of the riders 110 to monitor location and status of the public transit vehicles 104.

The route generation operation may be configured to monitor past decisions of each of the riders 110. The route generation operation may be configured to determine and consider a level of altruism of the riders 110. For example, a commuter that always selects the fastest transit option regardless of urgency, may be ranked with a low level of altruism. Commuters that consistently select a transit option that is based on urgency level may be ranked with a high level of altruism. The altruism level of the commuters may be aggregated and presented for display on the user interface. The altruism level may be indicative of the likelihood of the commuters being cooperative in achieving results that are optimal for the entire system rather than those options that are optimal for the individual.

At operation 714, the DSS 100 may present the transit options and estimates to the commuter. For example, the transit options and decision factors may be displayed via the user interface of the mobile device 108 as described previously herein.

At operation 716, the DSS 100 may monitor choices of the public transit route options made by the commuter 110 to update and maintain a commuter decision history for each commuter. The selected transit option may be determined based on an input from the commuter. The selected transit option may be determined by monitoring commuter location data and comparing to the proposed routing options. The selected transit option and the recommended transit options may be stored for later use in updating the commuter decision histories. The DSS 100 may generate one or more values that are indicative of commuter cooperativeness for each of the commuters presented with each of transit route options. The values may be increased when the commuter chooses a routing option for which a corresponding trip time is greater than a trip time corresponding to another of transit route options. That is, the commuter selected a routing option that benefits the community.

Prior approaches on decision making do not consider potential commuters (e.g., commuters that are just about to decide how/whether they will use public transit). Prior approaches only consider current commuters and the status of the transit system. Such an approach tends to present the same information and suggest the same routing options to all potential riders. The DSS 100 disclosed herein takes the interests and flexibility of each potential commuter into account and suggests different routing alternatives that fit the schedule of each commuter and encourages commuters to make community-aware decisions.

By sharing information, the DSS 100 can generate more preferable routing options. For example, the most direct route may be the fastest and typically the most crowded. A routing system that encourages or suggests that all commuters take this route may lead to larger crowds and/or wait times. The DSS 100 may analyze commuter needs and recommend this fastest route to those commuters that have a high level of urgency. Other commuters with lower urgency levels may be suggested to consider alternative routes. In this manner, the overall transit system may operate more efficiently. Commuters may be accepting of the alternative routes knowing that they are collaborating as a community. Further, by acting collaboratively, commuters may become more selective in their transit options.

The DSS 100 may improve the public transit experience for commuters by promoting community-aware actions for commuters. The DSS 100 may aid in reducing crowding for public transit options. By providing a mechanism for alerting commuters to the overall state of the community, commuters may be more satisfied with their transit choices. Commuters may compare their level of urgency with the urgency levels of peer commuters. In addition, commuters may view the level of altruism of peer commuters. Knowledge that peer commuters have altered their options to benefit the overall community may result in higher levels of satisfaction. Further, this knowledge may encourage the commuter to select altruistic alternatives on occasion. The DSS 100 may reduce crowding and wait times on some routes as commuters select more cooperative options. The DSS 100 encourages commuters to select more collaborative options.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A decision-support system for public transportation comprising:
   a controller operable to:
   receive crowd sourced data from a plurality of users;
   aggregate the crowd sourced data with public transportation data and externally collected data;
   generate a plurality of public transit route options for a commuter by applying a game theory algorithm to the crowd source data;
   present the plurality of public transit route options for the commuter and at least one display element that communicates relative values of a parameter corresponding to a decision factor that measures an expected impact on other commuters caused by the commuter selecting each of the public transit route options; and
   identify one of the public transit route options as a recommended option for the decision factor, wherein the decision factor is an urgency level of the other commuters expected to travel on each of the public transit route options and wherein the recommended option is the one of the public transit route options having a least urgency level, and wherein the decision factor is a measure of cooperativeness of the other commuters expected to travel on each of the public transit route options and the recommended option is the one of the public transit route options having a least measure of cooperativeness.

2. The decision-support system of claim 1 wherein the decision factor is a number of alternative transit choices available to the other commuters expected to travel on each of the public transit route options, and wherein the recommended option is the one of the public transit route options having a greatest number of alternative transit choices.

3. The decision-support system of claim 1, wherein the display element is a bar of a predetermined length having colored segments representing each of the public transit route options, and wherein a length of each of the colored segments is based on values associated with the decision factor for each of the public transit route options.

4. The decision-support system of claim 3, wherein the recommended option is identified by the one of the public transit route options associated with a left-most colored segment.

5. The decision-support system of claim 3, wherein the recommended option is identified by the one of the public transit route options associated with one of the colored segments being a predetermined color.

6. The decision-support system of claim 1, wherein the display element is an axis that defines an origin and defines markers displaced from the origin that represent each of the public transit route options, wherein the markers are displaced from the origin based on values associated with the decision factor for each of the public transit route options.

7. A decision-support system for a commuter interacting with a public transportation system, the decision-support system comprising:
   a controller operable to:
   receive crowd sourced data from a plurality of users;
   aggregate the crowd sourced data with public transportation data and externally collected data;
   generate a plurality of public transit route options for a commuter by applying a game theory algorithm to the crowd source data;
   re-generate the plurality of public transit route options for the commuter based on at least one decision factor that estimates an expected impact on other commuters resulting from the commuter choosing each of the public transit route options,
   generate a value indicative of commuter cooperativeness for each of the commuters presented with the transit route options, wherein the value increases when the commuter chooses a routing option for which a corresponding trip time is greater than a trip time corresponding to another of transit route options; and
   output, for display, values associated with the at least one decision factor to influence the commuter in making a route selection.

8. The decision-support system of claim 7, wherein the computing system is further programmed to monitor choices of the public transit route options made by the commuter to update and maintain a commuter decision history for each commuter.

9. The decision-support system of claim 7, wherein the computing system is further programmed to generate the public transit route options using a game theory algorithm that incorporates commuter decision histories and commuter behavior models to produce an equilibrium solution for all commuters.

10. The decision-support system of claim 7, wherein the computing system is further programmed to monitor choices by the commuters over time to produce a commuter behavior model and use the commuter behavior model to predict commuter responses to public transit route options.

11. The decision-support system of claim 7, wherein the computing system is further programmed to identify one of the public transit route options as being preferred for the at least one decision factor.

12. The decision-support system of claim 7, wherein the computing system is further programmed to generate at least one public transit route option for the commuter based on at least one decision factor that is based on a commuter profile and a commuter intent for a proposed commute.

13. The decision-support system of claim 7, wherein the computing system is further programmed to, for at least one of the decision factors, provide a public transit option that results in a preferred route for which other commuters have more alternatives than for the other public transit options.

14. A method comprising:
receiving crowd sourced data from a plurality of users;
aggregating the crowd sourced data with public transportation data and externally collected data;
generating a plurality of public transit route options for a commuter by applying a game theory algorithm to the crowd source data;
re-generating the plurality of public transit route options for the commuter based on at least one decision factor that estimates an expected impact on other commuters resulting from the commuter choosing each of the public transit route options;
generating a value indicative of commuter cooperativeness for each of the commuters presented with the transit route options, wherein the value increases when the commuter chooses a routing option for which a corresponding trip time is greater than a trip time corresponding to another of transit route options; and
outputting, for display, at least one display element that shows relative magnitudes of values associated with the at least one decision factor for each of the public transit route options to influence the commuter in making a route selection.

15. The method of claim 14 further comprising applying a game theory algorithm to generate the public transit route options for the commuter to find an equilibrium routing solution for all commuters.

16. The method of claim 14 further comprising receiving data from mobile devices of each of the commuters that includes commuter intent data and location data.

17. The method of claim 14 further comprising monitoring choices made by the commuter over time to produce a commuter behavior model and using the commuter behavior model to predict commuter responses to public transit route options.

* * * * *